US009557725B2

(12) United States Patent
Arunachalam et al.

(10) Patent No.: US 9,557,725 B2
(45) Date of Patent: Jan. 31, 2017

(54) APPARATUS AND METHOD FOR DETERMINING REPLACEMENT COMPATIBILITY OF FIELD DEVICES IN INDUSTRIAL PROCESS CONTROL SYSTEMS

(75) Inventors: Soundari Arunachalam, Bangalore (IN); Balaji Gururao, Erode (IN); Senthilkumar Dhanagopalan, Bangalore (IN); John Samuel, Pathanamthitta (IN); Matthew R. Schrier, Holland, PA (US); Mithun Biswas, Jagdalpur (IN)

(73) Assignee: Honeywell International Inc., Morris Plains, NJ (US)

( * ) Notice: Subject to any disclaimer, the term of this patent is extended or adjusted under 35 U.S.C. 154(b) by 680 days.

(21) Appl. No.: 13/584,595

(22) Filed: Aug. 13, 2012

(65) Prior Publication Data
US 2014/0046618 A1  Feb. 13, 2014

(51) Int. Cl.
*G05B 19/042* (2006.01)
(52) U.S. Cl.
CPC . *G05B 19/0428* (2013.01); *G05B 2219/14092* (2013.01); *G05B 2219/23467* (2013.01); *G05B 2219/25074* (2013.01); *G05B 2219/25428* (2013.01); *G05B 2219/31134* (2013.01); *G05B 2219/33331* (2013.01)
(58) Field of Classification Search
CPC .............. G05B 19/00; G05B 19/0405; G05B 2219/25428; G05B 2219/14092; G05B 2219/23467; G05B 2219/25074; G06F 15/00; G06F 15/0283; G06F 15/0225; G05F 15/00; G05F 15/0283; G05F 15/0225

USPC .......................................................... 702/127
See application file for complete search history.

(56) References Cited

U.S. PATENT DOCUMENTS

| 2005/0234886 | A1* | 10/2005 | Mohraz et al. .................... 707/3 |
| 2007/0079250 | A1* | 4/2007 | Bump ................ G05B 23/0216 715/762 |
| 2008/0303472 | A1* | 12/2008 | John .................. G05B 19/0426 318/568.2 |
| 2008/0307406 | A1 | 12/2008 | John et al. |
| 2011/0022979 | A1* | 1/2011 | Meier ...................... G01D 1/00 715/810 |

(Continued)

OTHER PUBLICATIONS

"OneWireless, Wireless Builder Users Guide", Honeywell, Jul. 2010, p. 101-107.

(Continued)

*Primary Examiner* — John Breene
*Assistant Examiner* — Lynda Dinh

(57) ABSTRACT

A method includes identifying device description files corresponding to first and second field devices associated with an industrial process control system. The method also includes comparing multiple field device characteristics of the first and second field devices using the device description files. The method further includes identifying any differences between the device characteristics of the first field device and the device characteristics of the second field device. In addition, the method includes determining a compatibility of the first and second field devices based on any identified differences. The field device characteristics can relate to field device attributes, field device function blocks, and function block parameters of the first and second field devices.

20 Claims, 9 Drawing Sheets

(56) References Cited

U.S. PATENT DOCUMENTS

2013/0257627 A1* 10/2013 Rafael .................. 340/691.6

OTHER PUBLICATIONS

"Experion PKS, Series a Fieldbus Interface Module User's Guide", Honeywell, Jul. 2010, p. 287-364.
John Yingst, "Honeywell Fieldbus Capabilities", Honeywell, Oct. 2006, 52 pages.

* cited by examiner

FIG. 2B

Device Replacement - HONEYWELL_ST3000

- Device Information
- Select Replacement Device
- Validate Replacement Device
- QVCS Check out
- Transfer device data
- Custom instructions
- Replace Device
- QVCS Checkin
- Summary

202

Selected Device for replacement

△ HONEYWELL_ST3000 — 210

Listed below are uncommissioned, preauthorized devices on link FFLINK_139 that can replace the selected device.

Uncommissioned Devices on the link — 212

| Tag | Address | Range | Device ID | Template | Vendor | Model Name | Device Rev | DD Rev | Authorized | Instruction | Type |
|-----|---------|-------|-----------|----------|--------|------------|------------|--------|------------|-------------|------|
| ST35 | 26 | Permanent | 011552 | Honeywell : ST35 | Honeywell | 0402 | 19 | 04 | ⟳ | 📄 | Like |
| ST36 | 27 | Permanent | 030065 | Honeywell : ST36 | Honeywell | 0301 | 09 | 01 | ⊗ | | Like |

Pre-authorized device templates — 214

| Device ID | Template | Vendor | Model Name | Device Rev | DD Rev | Instruction | Type |
|-----------|----------|--------|------------|------------|--------|-------------|------|
| 011552 | Honeywell : ST35 | Honeywell | 0402 | 17 | 04 | 📄 | Like |
| 052600 | ABB : 2600T | ABB | 2600T | 02 | 01 | 📄 | Disparate |

⟳ Authorized  ⊗ Unauthorized  📄 Instruction 204
206

[Refresh] [Back] [Next] [Cancel]

Device Replacement - HONEYWELL_ST3000

You have chosen to replace device Honeywell_ST3000 with ST35

| Device to be Replaced | Replacement Device |
|---|---|
| △ Honeywell_ST3000  216 | △ ST35 |

▽ Device Differences  (=) 220

| Operating current | : 3.8mA | 3.8mA |
| Boot class | : Basic | Basic |
| EDDL support | : No | No |
| DTM support | : No | No |

△ Block Differences  218

△ Parameter Differences

▽ Connection Differences

▽ Missing Connection (−) 224  222
    CM1.AI.DEV_HI > CM2.PID.HIHI
    CM1.AI.DEV_LO > CM2.PID.LO

204 —

(−) Missing  (+) New  (=) Identical

△ About the Steps   206

[Back] [Next] [Generate Report] [Cancel]

Sidebar (202):
- Device Information ✓
- Select Replacement Device ✓
- Validate Replacement Device
- QVCS Check out
- Transfer device data
- Custom instructions
- Replace Device
- QVCS Checkin
- Summary

200

Device Compatibility Report

300

| HONEYWELL_ST3000 | |
|---|---|
| Device Details | |
| Device TAG | : HONEYWELL_ST3000 |
| Device ID | : 005100HoneywellST300081255 |
| Model Name | : ST3000F |
| Address | : 31 |
| Device Rev | : 17 |
| DD Rev | : 4 |
| Range | : Permanent |
| Vendor | : Honeywell |
| FIM Name | : FIM_138 |
| FF Link Name | : FFLINK_139 |

⇒

| STT35F | |
|---|---|
| Device Details | |
| Device TAG | : HONEYWELL_ST3000 |
| Device ID | : 005100HoneywellST300081255 |
| Model Name | : ST3000F |
| Address | : 31 |
| Device Rev | : 17 |
| DD Rev | : 4 |
| Range | : Permanent |
| Vendor | : Honeywell |
| FIM Name | : FIM_138 |
| FF Link Name | : FFLINK_139 |

302

Replacement Compatibility Result - *Warning* — 304

1. Field device attributes compatibility

306

| Attribute | HONEYWELL_ST3000 | STT35F | Result |
|---|---|---|---|
| Master / Slave capability | Basic | Basic | OK |
| Resource availability | | | |
|    Number of communication objects | 16 | 16 | OK |
|    Number of Link objects | 14 | 14 | OK |
| Operating Current | 3.8mA | 3.8mA | OK |
| Special field device features | | | |
|    EDDL | No | No | OK |
|    Conditional | No | No | OK |
| Firmware Download Type | Class 1 | Class 1 | OK |

308

1. Field device Blocks compatibility

| Attribute | HONEYWELL_ST3000 | | | STT35F | | | Result |
|---|---|---|---|---|---|---|---|
| Number of Blocks | 4 | | | 4 | | | OK |
| Type of Blocks | Block Name | Block Internal reference number | Block Execution Time | Block Name | Block Internal reference number | Block Execution Time | |
| | AI | 257 | 736 | AI | 257 | 736 | OK |
| | PID | 310 | 2880 | PID | 310 | 2880 | OK |
| | RESOURCE | 400 | | RESOURCE | 400 | | OK |
| | TRANSDUCER | 470 | | TRANSDUCER | 470 | | OK |

FIG. 3A

3. Parameter compatibility

| Attribute | | | | | | | | Result |
|---|---|---|---|---|---|---|---|---|
| List of Parameters | | | | | | | | |
| Block Name | | Parameter Name | Internal reference number | | Default value | | Range value | |
| | | | HONEYWELL_ ST30002 | STT35F | HONEYWELL_ ST30002 | STT35F | HONEYWELL_ ST30002 | STT35F |
| ▽ AI | = | BLOCK_ERR.DISABLED | 258 | 258 | 0x0 | 0x0 | | | OK |
| | = | OFFNETALM_ENABLED | 259 | 259 | F | F | | | OK |
| | = | ST_REV | 260 | 260 | 0 | 0 | | | OK |
| | ○ ○ ○ | | ○ ○ ○ | ○ ○ ○ | ○ ○ ○ | ○ ○ ○ | ○ ○ ○ | ○ ○ ○ | |
| △ PID | | | | | | | | OK |
| △ RESOURCE | | | | | | | | Warning |
| △ TRANSDUCER | | | | | | | | OK |

APPARATUS AND METHOD FOR DETERMINING REPLACEMENT COMPATIBILITY OF FIELD DEVICES IN INDUSTRIAL PROCESS CONTROL SYSTEMS

TECHNICAL FIELD

This disclosure relates generally to industrial process control systems. More specifically, this disclosure relates to an apparatus and method for determining replacement compatibility of field devices in industrial process control systems.

BACKGROUND

Processing facilities are often managed using industrial process control systems. Example processing facilities include manufacturing plants, chemical plants, crude oil refineries, ore processing plants, and paper or pulp manufacturing and processing plants. Among other things, industrial process control systems typically include controllers that receive measurement data from sensors and provide control signals to actuators in the processing facilities.

Field devices (such as sensors and actuators) in an industrial process control system are often provided by multiple manufacturers. Often times, a process control system is configured to operate with specific types of field devices. If a field device fails, an operator is typically faced with either locating an identical field device or reconfiguring the control system to work with a new field device.

SUMMARY

This disclosure provides an apparatus and method for determining replacement compatibility of field devices in industrial process control systems.

In a first embodiment, a method includes identifying device description files corresponding to first and second field devices associated with an industrial process control system. The method also includes comparing multiple field device characteristics of the first and second field devices using the device description files. The method further includes identifying any differences between the device characteristics of the first field device and the device characteristics of the second field device. In addition, the method includes determining a compatibility of the first and second field devices based on any identified differences.

In a second embodiment, an apparatus includes at least one memory configured to store device description files corresponding to first and second field devices associated with an industrial process control system. The apparatus also includes at least one processing device configured to compare multiple field device characteristics of the first and second field devices using the device description files, identify any differences between the device characteristics of the first field device and the device characteristics of the second field device, and determine a compatibility of the first and second field devices based on any identified differences.

In a third embodiment, a non-transitory computer readable medium embodies a computer program. The computer program includes computer readable program code for identifying device description files corresponding to first and second field devices associated with an industrial process control system. The computer program also includes computer readable program code for comparing multiple field device characteristics of the first and second field devices using the device description files. The computer program further includes computer readable program code for identifying any differences between the device characteristics of the first field device and the device characteristics of the second field device. In addition, the computer program includes computer readable program code for determining a compatibility of the first and second field devices based on any identified differences.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2E illustrate an example graphical user interface for use with a tool that determines replacement compatibility of field devices in an industrial process control system according to this disclosure;

FIGS. 3A and 3B illustrate an example compatibility report identifying replacement compatibility of field devices in an industrial process control system according to this disclosure.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
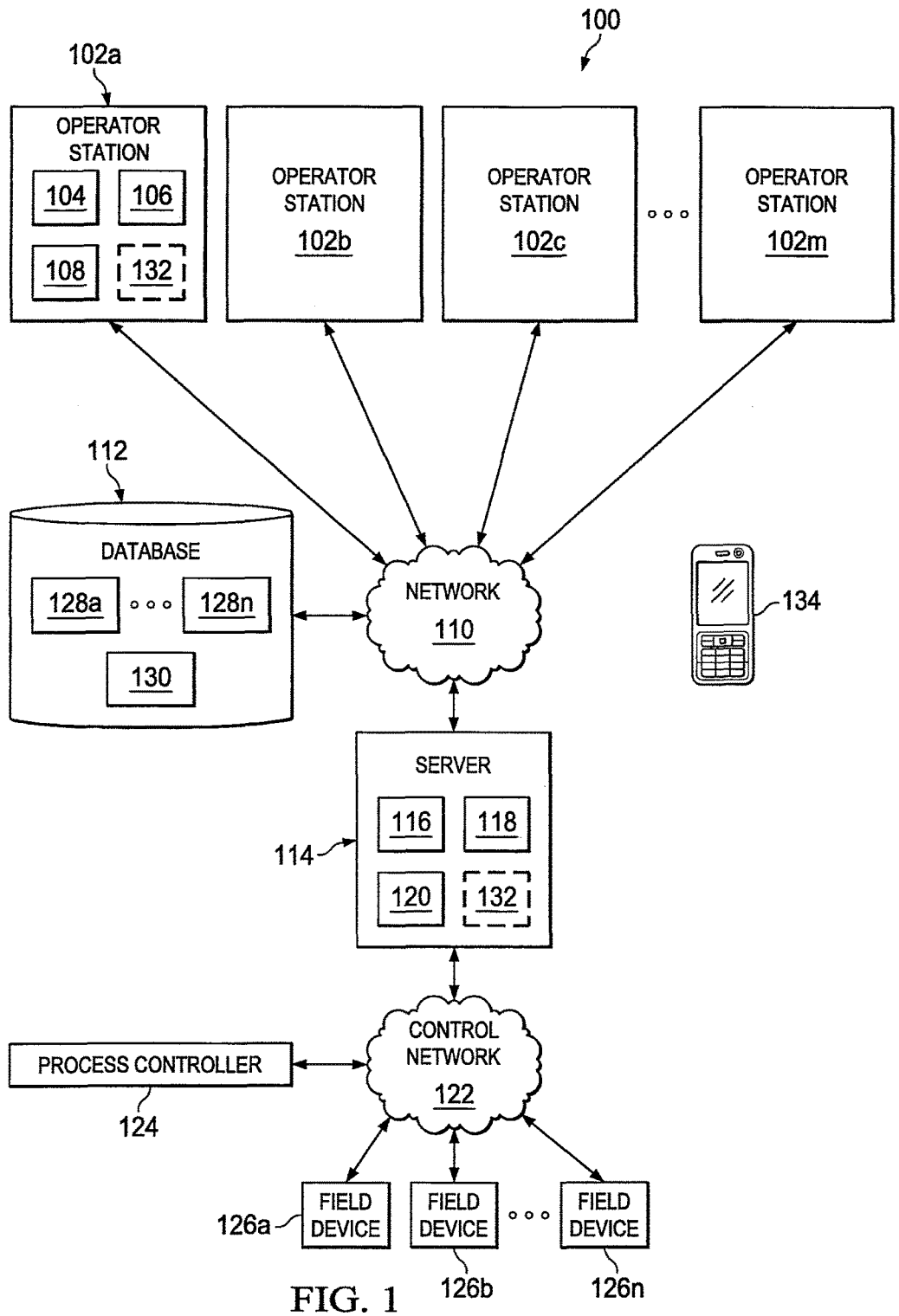
FIG. 1 illustrates an example industrial process control system according to this disclosure.

FIG. 1 illustrates an example industrial process control system 100 according to this disclosure. As shown in FIG. 1, the system 100 includes multiple operator stations 102a-102m, which provide users with the capability of managing or otherwise interacting with various other devices in the system 100. The operator stations 102a-102m could also provide various other capabilities, such as allowing users to configure process control strategies manually. As a particular example, the operator stations 102a-102m could display user interfaces that personnel can use to manage field devices 126a-126n. A user interface could present various screens to a user, receive user inputs, and provide responses.

Each operator station 102a-102m includes any suitable structure, such as a computing device, for supporting user access or control of one or more devices. In particular embodiments, each operator station 102a-102m includes one or more processing devices 104 (such as at least one microprocessor, microcontroller, DSP, FPGA, or ASIC). Each operator station 102a-102m also includes one or more memories 106 storing instructions and data used, generated, or collected by the processing device(s). Each operator station 102a-102m further includes one or more network interfaces 108 supporting communication over at least one wired or wireless network (such as an Ethernet interface).

A network 110 facilitates communication between various components of the system 100, such as between the operator stations 102a-102m, a database 112, and a server 114. The network 110 includes any suitable network(s) for facilitating communications between networked components. The network 110 could also support any suitable wired or wireless communication protocols or technologies, such as Ethernet, ATM, or TCP/IP.

The database 112 provides a central repository for storing information related to various devices in the system 100. For example, the database 112 could store information related to field devices 126a-126n or maintenance schedules of the field devices 126a-126n. At least some of the stored information can be retrieved and used to determine the compatibility of different field devices 126a-126n. The database 112 includes any suitable structure supporting the storage and retrieval of information.

The server 114 supports various functions depending on the implementation of the system 100. For example, the server 114 can help to retrieve information from the database 112 and provide the retrieved information to the operator stations 102a-102m. The server 114 can also interface with process control components to control an industrial process based on user input from the operator stations 102a-102m. The server 114 includes any suitable computing device for executing one or more functions. In particular embodiments, the server 114 includes one or more processing devices 116; one or more memories 118 storing instructions and data used, generated, or collected by the processing device(s); and one or more network interfaces 120 supporting communication over at least one network.

A control network 122 couples the server 114 and a process controller 124 with various field devices 126a-126n. The control network 122 includes any suitable network(s) for facilitating communications to and from process control components. For example, the control network 122 may contain various network devices (such as multiplexors, modems, or termination panels) operating according to one or more protocols (such as HART, FOUNDATION Fieldbus, or Control Net).

The process controller 124 can issue commands to control the operation of various field devices 126a-126n in order to implement a desired control strategy in an industrial environment. The desired control strategies could be programmed by the server 114 using control strategies that are specified in the database 112. Inputs received from operator stations 102a-102m could be used to select and modify the control strategies. The process controller 124 may also receive measurement data, status information, or other data from various field devices 126a-126n, which can be used in the control strategies. The process controller 124 includes any suitable structure for implementing one or more control strategies.

The field devices 126a-126n can implement a wide variety of functions in a process control system to monitor or control an industrial process. For example, the field devices 126a-126n could represent sensors measuring various process variables (such as temperature or pressure sensors). The field devices 126a-126n could also represent actuators for altering operation of an industrial process (such as valves). The field devices 126a-126n could further represent relays or any other devices that perform various operations under the control of a process controller.

The various field devices' manufacturer(s) or vendor(s) may provide device description files 128a-128n for the field devices 126a-126n (such field devices 126a-126n may be known as "smart" field devices). Each device description file 128a-128n represents a machine-readable file containing information relating to a field device and its capabilities. The device capabilities can include the manner in which the field device may behave in different conditions, management commands that can be sent to the field device, and status information or results of execution of management commands that can be viewed. As particular examples, the information could include information about field device attributes, field device function blocks, and function block parameters. These types of characteristics are collectively referred to as "field device characteristics." The device description files 128a-128n can be stored in the database 112. Note, however, that the device description files 128a-128n could be stored at any other suitable location(s) and in any other suitable storage device(s), such as on a removable storage device like a Flash memory or at a manufacturer or vendor's web server and downloaded through a communication link.

The device description files 128a-128n represent any suitable files describing field devices 126a-126n. The device description files 128a-128n could, for example, include DD (device description) files, EDD (electronic device description) files, CFF (Common File Format) files, value files, or any other auxiliary data source pertaining to a field device. These types of files or other data structures are collectively referred to as "device description files."

As noted above, a field device may need to be replaced from time to time. When this occurs, an operator could try to replace the field device with another instance of the exact same field device. However, it can often be difficult finding a replacement field device that exactly matches a field device to be replaced. Various causes may exist for this difficulty, such as when the field device to be replaced has been discontinued by a manufacturer or has become obsolete due to upgrades. The operator could also replace the field device with a different type of field device. The different type of field device could differ in a number of ways, such as by manufacturer, model, device description revision, or firmware version. It is often not immediately apparent whether the replacement field device is compatible with the field device being replaced.

Because of this, it is often difficult to determine whether one field device can be replaced with another field device without re-engineering the control system configuration or changing the configuration of other elements in the control system. This can lead to various problems. For example, at system planning time, this can create issues in deciding the inventory of field devices to be maintained at an industrial facility. When a field device fails, this can cause trouble in finding a compatible replacement device, which increases the down-time of the facility. Choosing the wrong device as a replacement can require re-engineering of the control system configuration, cause network overloads, or demand changes to network scheduling algorithms. During project commissioning, this can create issues in determining the effect of replacing an incorrect device type or device version chosen at engineering time with an actual device type in the facility. Finally, during field device upgrades to newer versions or types, there is typically no mechanism for listing potential control issues that could occur due to the upgrade.

In accordance with this disclosure, the system 100 supports a tool 132 to automatically determine whether two field devices are compatible. The tool 132 can compare multiple device description files 128a-128n to determine the compatibility of multiple field devices associated with those files 128a-128n. The tool 132 can also provide a replacement compatibility report for those field devices. The report can identify whether different field devices are compatible and, if not, the reasons for the incompatibility. The tool 132 can perform this comparison for any field devices, including instances of configured field devices already installed in a facility.

In some embodiments, the compatibility check can include comparisons of multiple field devices' attributes, blocks, parameters, or other field device characteristics. Field device attributes represent general characteristics of a field device, such as master/slave capabilities of the device, available resources in the device, and commands supported by the device. A field device is often implemented using multiple function blocks, which implement various functions of the field device. Example blocks can include an analog input or output block, a digital input or output block, and a proportional-integral-derivative (PID) control block. A block is typically formed using one or more parameters, which define various variables and other characteristics of the block. Example parameters can include specified variables, the variables' default values, and the variables' range of possible values.

By comparing the field device characteristics of multiple field devices, the tool 132 can identify whether those field devices are compatible and to what extent they are not compatible. Indicators can be used to identify the compatibility of the field device, and graphical user interfaces and reports can be used to identify the compatibility. This information can be used to determine whether one field device can replace another field device and what actions may need to be taken during the replacement.

Additional details regarding the tool 132 are provided below. The tool 132 could be implemented in any suitable manner. For example, the tool 132 could be implemented using at least one software application. The application could be executed by any suitable device(s) within or associated with the system 100, such as one or more operator stations 102a-102m, the server 114, or other device(s). In particular embodiments, the application could support the use of a graphical user interface that allows users to select device description files 128a-128n associated with two or more field devices, invoke comparison of the device description files 128a-128n, and view the compatibility of the associated field devices. The application can include any additional functionality. Note that while the use of a software application is described here, the same functionality could be implemented using only hardware or a combination of hardware and software/firmware.

Note that while the use of operator stations 102a-102m in conjunction with the tool 132 is described here, the tool 132 could be used in conjunction with any other suitable devices. For example, users could invoke execution of the tool 132 using one or more portable devices 134, such as portable wireless or wired devices. Each portable device 134 could communicate in either a wired or wireless manner with the server 114, the operator stations 102a-102m, the process controller 124, or any other or additional components in the system 100. Each portable device 134 represents any suitable handheld or other portable device that can facilitate interaction with a user, such as a laptop computer or smartphone.

Although FIG. 1 illustrates one example of an industrial process control system 100, various changes may be made to FIG. 1. For example, the system 100 could include any number of field devices, networks, servers, operator stations, control system components, databases, and portable devices. Also, the makeup and arrangement of the system 100 are for illustration only. In addition, FIG. 1 illustrates one example operational environment in which the compatibility of field devices can be checked. This functionality could be used in any other suitable system.

FIGS. 2A through 2E illustrate an example graphical user interface 200 for use with a tool that determines replacement compatibility of field devices in an industrial process control system according to this disclosure. The interface 200 could, for example, be generated by the tool 132 in the system 100 to facilitate interaction with one or more users.

In general, the interface 200 could be invoked by a user in any suitable manner. For example, the interface 200 could be invoked using a drop-down menu or context menu of another application, such as in a CONTROL BUILDER application from HONEYWELL INTERNATIONAL INC. When invoked in this way, the interface 200 could have access to process control logic being used in an industrial facility. Also, invocation of the tool 132 could be restricted to certain operators, such as those designated as having "Operator" or "Engineer" security privileges or higher.

Figure 2A:
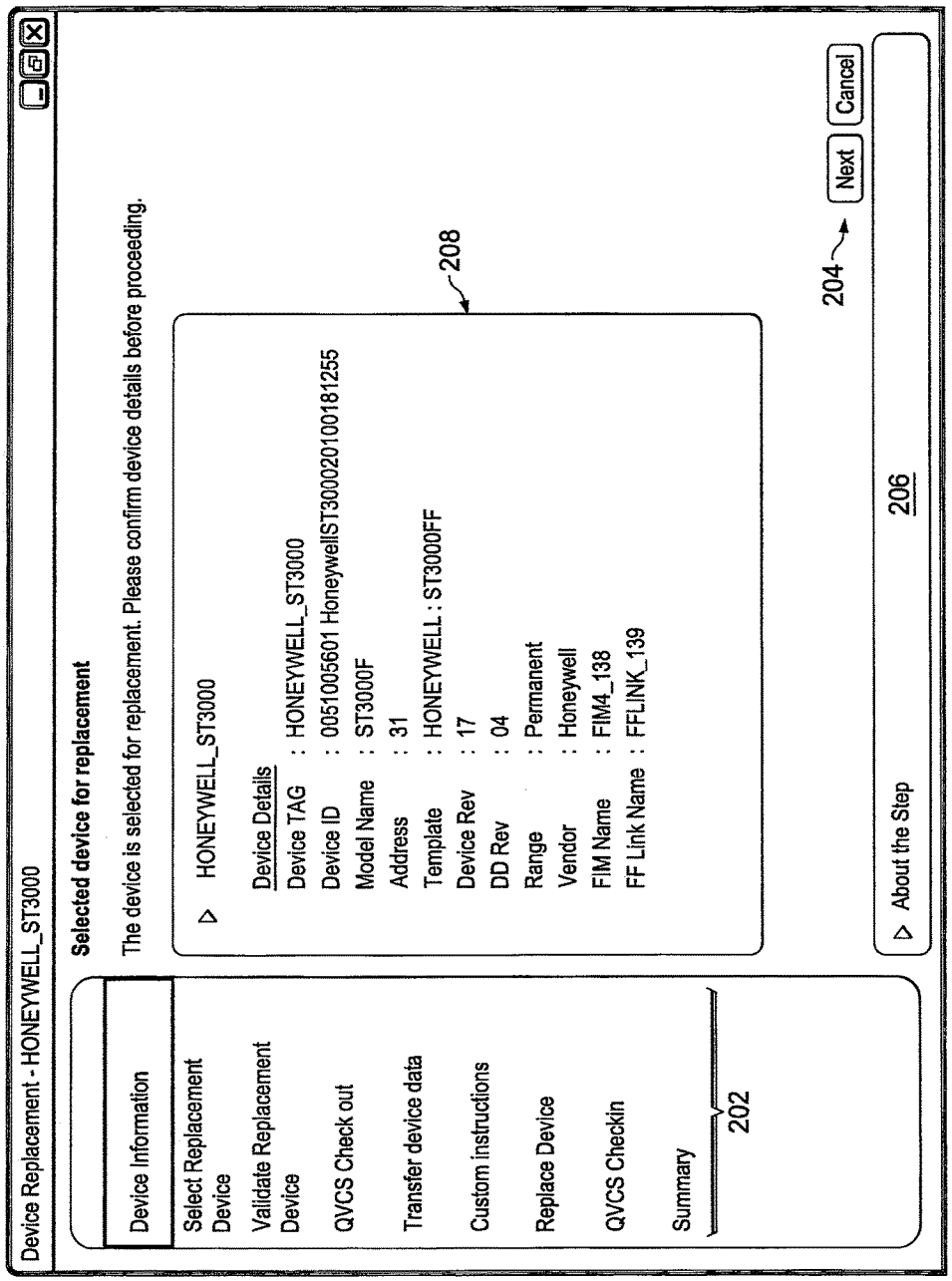

As shown in FIG. 2A, the interface 200 includes a step list 202, which identifies the various steps to be performed in order to replace one field device with another field device. The current step being performed could be highlighted or identified in any other suitable manner in the list 202. The interface 200 also includes buttons 204 for proceeding to the next step in the list 202 or cancelling the replacement process. The interface 200 further includes a drop-down text area 206, which can be selected by a user to view detailed information about the current step in the replacement process.

In this example, the first step in the replacement process provides details of the field device to be replaced. The details of the field device to be replaced are provided in a text box 208. Here, the details include a tag, identifier, model, network address, template, device revision, device description revision, range, vendor, Fieldbus interface module (FIM) name, and FOUNDATION Fieldbus link name. Note that these details are for illustration only and vary depending on the field device selected for replacement.

As shown in FIG. 2B, the next step in the replacement process involves selecting the replacement field device. Here, the interface 200 includes an identifier 210 identifying the field device to be replaced. The interface 200 also includes two tables 212-214 identifying different field devices that could be selected as the replacement device. The table 212 identifies field devices that are already installed but not commissioned in a control system. The table 214 identifies field devices for which pre-authorized device templates are available for selection by the user. Various information is provided for each listed field device, including a link to instructions for configuring or otherwise interacting with the field device. Also included for each listed field device is a "Type" indicator identifying how similar that field device is to the field device being replaced. Example "Type" values are shown in Table 1.

TABLE 1

| Replacement Type | Manufacturer | Device Type | Device Revision |
|---|---|---|---|
| Identical | Same | Same | Same |
| Like | Same | Same | High/Low |
| Equivalent | Same | Same | High/Low (OD indexes of common blocks are different) |
| Disparate | Different | Different | Different |

Figure 2D:
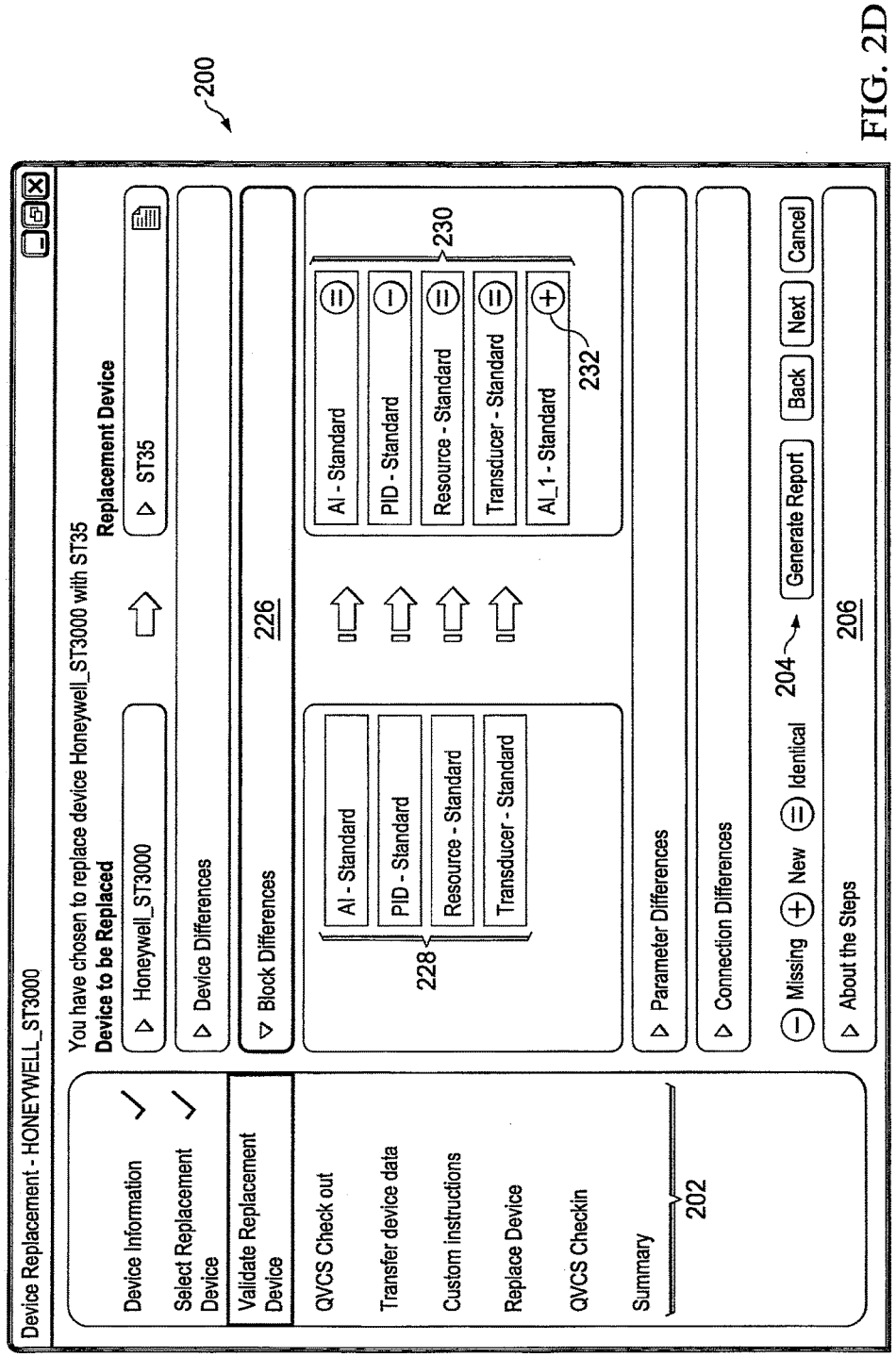
Figure 2E:
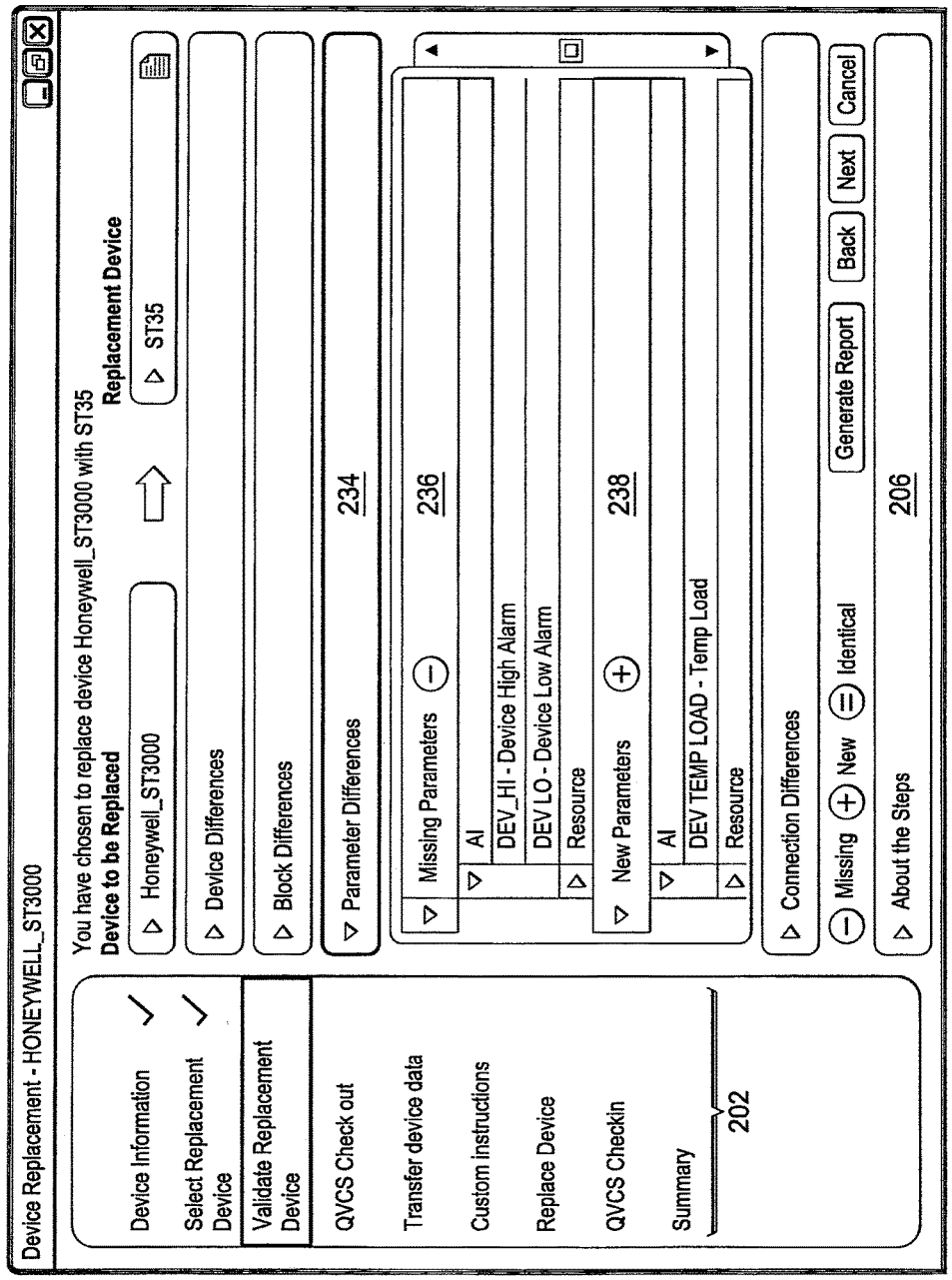

Once the user selects the replacement field device, the tool 132 compares the field devices using the device description files 128a-128n for those field devices. The results of the comparison are presented to the user as shown in FIGS. 2C through 2E. In FIG. 2C, a text area 216 identifies the field device to be replaced on the left and the replacement field device on the right. The interface 200 also includes various drop-down areas that identify any differences between those two field devices. In this example, the interface 200 includes four drop-down text areas identifying device differences, function block differences, function block parameter differences, and connection differences.

A "device differences" text area 218 identifies any differences in field device attributes between the two field devices. In this case, there are no differences between the device attributes of the field devices, and an indicator 220 indicates that the field device attributes are identical. A "connections" text area 222 lists the possible connection breakages in process control logic as a result of a field device's replacement. An indicator 224 here indicates that there is a missing connection possibility as a result of the replacement.

Continuing in FIG. 2D, a "blocks" text area 226 identifies any differences in function blocks involving the two field devices. In this case, the text area 226 includes a listing 228 of all function blocks in the field device to be replaced. The text area 226 also includes a listing 230 that includes all of the function blocks from the listing 230, as well as any new function blocks in the replacement field device. If the exact same function block is included in both field devices, an indicator 232 shows that those function blocks are identical. If a function block in the device to be replaced is not included in the replacement device, an indicator 232 identifies that function block as missing in the replacement device. If a function block in the replacement device is not included in the device to be replaced, an indicator 232 identifies that function block as new in the replacement device. If function blocks of the same name are included in both field devices but the function blocks have one or more differences, both the missing and new indicators 232 could be used.

Continuing in FIG. 2E, a "parameters" text area 234 identifies any differences in function block parameters between the two field devices. In this case, the text area 234 includes a listing 236 of any parameters from the device to be replaced that are missing in the replacement device. The text area 234 also includes a listing 238 of any new parameters in the replacement device that are not in the device to be replaced.

Using the interface 200 as shown in FIGS. 2C through 2E, a user can identify the differences between different field devices' characteristics. The interface 200 also includes a "Generate Report" button 204, which invokes generation of a report identifying the compatibility of the field devices. Details of an example report are given below in FIGS. 3A and 3B.

Assuming the user wishes to proceed with the device replacement, the process performs various additional steps to facilitate the actual physical replacement of a field device. This can include procedure qualification and version checkout, transfer of device data, performance of custom tasks, physical field device replacement, and procedure qualification and version check-in. These operations are known in the art and are not further described here.

Although FIGS. 2A through 2E illustrate one example of a graphical user interface 200 for use with a tool that determines replacement compatibility of field devices in an industrial process control system, various changes may be made to FIGS. 2A through 2E. For example, the content and arrangement of the interface 200 are for illustration only, and other interfaces having other content or arrangements could be used. Also, while specific input/output mechanisms (such as text areas, drop-down areas, and buttons) have been described, other input/output mechanisms could be used. Further, the interface 200 has been described as supporting a process that includes both the identification of field device compatibility and the replacement of a field device. However, the identification of field device compatibility could be used in any other suitable manner, including in a stand-alone manner.

FIGS. 3A and 3B illustrate an example compatibility report 300 identifying replacement compatibility of field devices in an industrial process control system according to this disclosure. As noted above, the report 300 can be generated identifying the compatibility of selected field devices.

In this example, the report 300 includes a device identification section 302, which contains information about a replacement field device and a field device to be replaced. The information here represents the same information provided in the text box 208 described above. Once again, note that these details are for illustration only and vary depending on the field devices selected.

The report 300 also includes an overall replacement compatibility result 304, which identifies the overall compatibility between the two field devices. In some embodiments, the replacement compatibility result 304 could have a value of OK, Warning, or Error. A value of OK indicates that the replacement field device is compatible with the field device to be replaced. Warning and Error values identify incompatibilities between the field devices, where the incompatibilities have different priorities.

The report 300 further includes three compatibility report sections 306-310. Each section 306-310 identifies the compatibility between different aspects of the field devices. In this example, the section 306 identifies the compatibility between the field devices' attributes, the section 308 identifies the compatibility between the field devices' blocks, and the section 310 identifies the compatibility between the field devices' parameters. Once again, in some embodiments, the report 300 contains a value of OK, Warning, or Error for each field device feature. A value of OK indicates that the field device feature in the device to be replaced is compatible with the field device feature in the replacement device. Warning and Error values identify incompatibilities in the field device features of the devices, where the incompatibilities have different priorities.

Example report values for field device attribute features in section 306 are shown in Table 2.

TABLE 2

Field Device Attributes Compatibility

| Attribute | Check | Result Priority |
|---|---|---|
| Capability - Master/Slave | Same capability in both devices | OK |
| | Master device replacing slave device | Warning |
| | Slave device replacing master device | Error |
| Capability of Field Device Resource Availability - Number of Communication Objects or Number of Link Objects | Equal number of resources in devices | OK |
| | More resources available in replacement device | Warning |
| | Less resources available in replacement device | Error |
| Operating | Same operating current in devices | OK |

TABLE 2-continued

Field Device Attributes Compatibility

| Attribute | Check | Result Priority |
|---|---|---|
| Current | Less operating current in replacement device | Warning |
| | More operating current in replacement device | Error |
| Special Field Device Features (EDDL, Conditional Evaluation, etc.) | Same type of special features in devices | OK |
| | Replacement device contains special features and device to be replaced does not | Warning |
| | Replacement device does not contain special features and device to be replaced does | Error |
| Firmware Download Type | Same firmware download type | OK |
| | Different firmware download types | Error |
| Supported Commands | Both devices support same commands | OK |
| | Specific command supported in replacement device is not available in device to be replaced | Warning |
| | Specific command supported in device to be replaced is not available in replacement device | Error |

Example report values for field device block features in section 308 are shown in Table 3.

TABLE 3

Blocks Compatibility

| Attribute | Check | Result Priority |
|---|---|---|
| Number and Type of Blocks | Replacement device has all blocks that are present in device to be replaced | OK |
| | Replacement device does not have all blocks that are present in device to be replaced | Error |
| Block Internal reference number | Internal reference numbers of common blocks are the same | OK |
| | Internal reference numbers of common blocks are different | Error |
| Block Execution Time | Block execution times of common blocks are the same | OK |
| | Block execution times of common blocks are different | Error |

Example report values for field device parameter features in section 310 are shown in Table 4.

TABLE 4

Parameter Compatibility

| Attribute | Check | Result Priority |
|---|---|---|
| List of Parameters | Replacement device contains all common parameters of device to be replaced | OK |
| | Replacement device contains additional parameters than device to be replaced | OK |
| | Replacement device contains less parameters than device to be replaced | Error |
| Internal Reference Number of Common Parameters | Internal reference numbers of common parameters are the same | OK |
| | Internal reference numbers of common parameters are different | Error |
| Default Value | Same default value for common parameters | OK |
| | Different default values for common parameters | Warning |
| Range Value | Same range value for common parameters | OK |
| | Different range values for common parameters | Warning |

TABLE 4-continued

Parameter Compatibility

| Attribute | Check | Result Priority |
|---|---|---|
| Other Parameter Attributes | Same parameter attributes for common parameters | OK |
| | Different parameter attributes for common parameters | Warning |

In the report 300 shown in FIGS. 3A and 3B, the Warning value of the replacement compatibility result 304 is caused by an incompatibility identified in section 310.

In the report 300, these different field device features can be identified, and the appropriate result priority can be provided for each field device feature. Graphical indicators could also be used to graphically identify the result priority for each field device feature. For example, different colors could be used to visually identify the result priority, such as green for OK values, yellow for Warning values, and red for Error values.

Although FIGS. 3A and 3B illustrate one example of a compatibility report 300 identifying replacement compatibility of field devices in an industrial process control system, various changes may be made to FIGS. 3A and 3B. For example, the content and arrangement of the compatibility report 300 are for illustration only, and other compatibility reports having other content or arrangements could be used.

Figure 4:
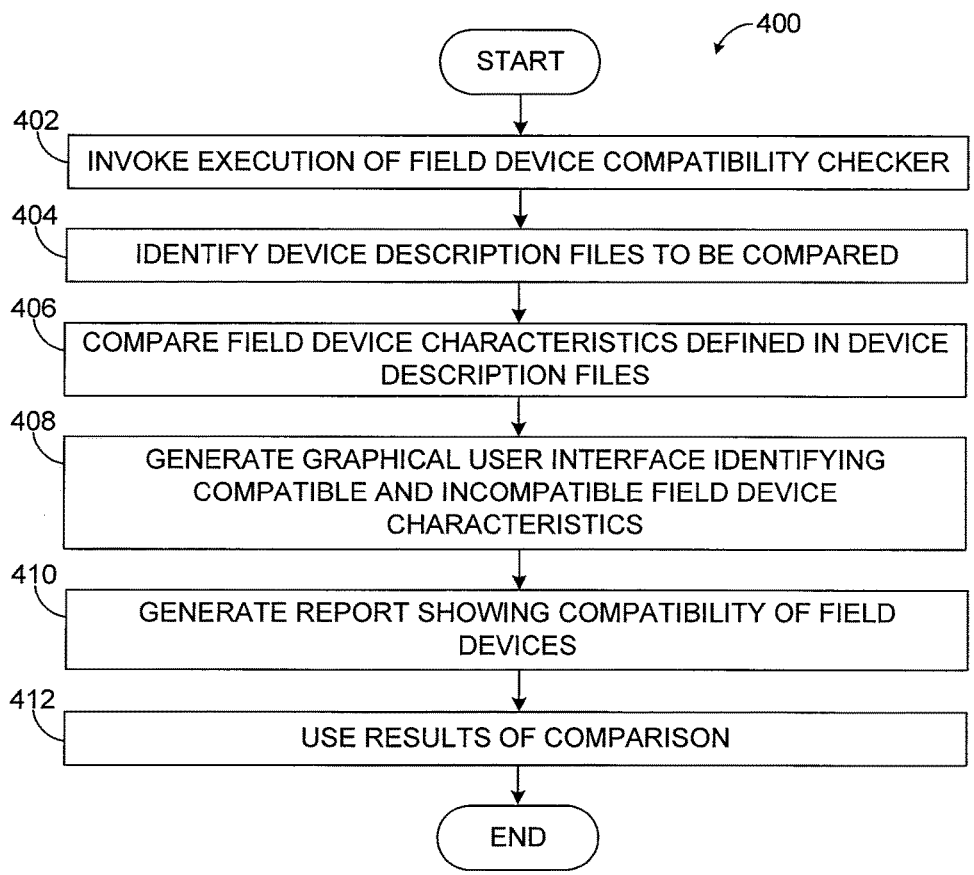
FIG. 4 illustrates an example method for determining replacement compatibility of field devices in an industrial process control system according to this disclosure.

FIG. 4 illustrates an example method 400 for determining replacement compatibility of field devices in an industrial process control system according to this disclosure. For ease of explanation, the method 400 is described with respect to the tool 132 operating in the system 100 of FIG. 1. The method 400 could be performed by any other suitable device or system.

Execution of a field device compatibility checker is invoked at step 402. This could include, for example, a user invoking execution of the tool 132 in a stand-alone manner or from another application. Two or more device description files are identified at step 404. This could include, for example, the user using the interface 200 to identify a field device 126a-126n to be replaced. This could also include the user using the interface 200 to identify one or more types of field devices that might be used as replacement devices.

Field device characteristics defined in the identified device description files are compared at step 406. This could include, for example, the tool 132 comparing the field device attributes, function blocks, and function block parameters defined in the different device description files.

A graphical user interface identifying compatible and incompatible field device characteristics is generated at step 408, and a report showing the compatibility of the field devices is generated at step 410. This could include, for example, the tool 132 generating the contents of the interface 200 shown in FIGS. 2C through 2E, which identify common or different field device attributes, function blocks, and function block parameters between the field devices. This could also include the tool 132 generating an electronic or printed report 300 as shown in FIGS. 3A and 3B, which can identify different results of the comparisons between the attributes, blocks, and parameters associated with the field devices.

The results of the comparison can be used in any suitable manner at step 412. For example, the results of the comparison can merely be presented to the user for use in identifying a compatible replacement field device. The results of the comparison can also be used to facilitate the actual replacement of a field device. The results of the comparison can be used in any other way without departing from the scope of this disclosure.

Although FIG. 4 illustrates one example of a method 400 for determining replacement compatibility of field devices in an industrial process control system, various changes may be made to FIG. 4. For example, the method 400 could include performing only one of the steps 408-410. Also, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying, by a processing device, device description files corresponding to first and second field devices associated with an industrial process control system;
   comparing, by the processing device, multiple field device characteristics of the first and second field devices using the device description files;
   identifying, by the processing device, any differences between the device characteristics of the first field device and the device characteristics of the second field device;
   determining, by the processing device, a compatibility of the first and second field devices based on any identified differences; and
   generating, by the processing device, a graphical user interface identifying any differences between the device characteristics of the first field device and the device characteristics of the second field device, wherein the graphical user interface includes:
      a first indicator representing one or more device characteristics that are identical between the first and second field devices;
      a second indicator representing one or more device characteristics that are present in the first field device and not present in the second field device; and
      a third indicator representing one or more device characteristics that are new in the second field device and not present in the first field device;
      wherein the first, second, and third indicators are visually different from each other.

2. The method of claim 1, further comprising:
   generating a report identifying results of the comparisons of the device characteristics.

3. The method of claim 2, wherein the report identifies an overall replacement compatibility result and a result of a comparison of each device characteristic.

4. The method of claim 1, wherein the field device characteristics relate to field device attributes, field device function blocks, and function block parameters of the first and second field devices.

5. The method of claim 4, wherein identifying any differences comprises:
   identifying field device attributes that are identical between the field devices, that are different between the field devices, that are present in the first field device and missing in the second field device, and that are new in the second field device and not present in the first field device;
   identifying field device function blocks that are identical between the field devices, that are different between the field devices, that are present in the first field device and missing in the second field device, and that are new in the second field device and not present in the first field device; and
   identifying function block parameters that are identical between the field devices, that are different between the field devices, that are present in the first field device and missing in the second field device, and that are new in the second field device and not present in the first field device.

6. The method of claim 4, wherein determining the compatibility comprises:
   determining whether each field device attribute is compatible between the field devices and, if not, identifying a priority of the incompatibility for that field device attribute;

determining whether each field device function block is compatible between the field devices and, if not, identifying a priority of the incompatibility for that field device function block; and determining whether each function block parameter is compatible between the field devices and, if not, identifying a priority of the incompatibility for that function block parameter.

7. The method of claim 1, further comprising:

receiving, through the graphical user interface, a user selection of the device description files corresponding to the first and second field devices, wherein, for each of the field device characteristics of the first and second devices, the graphical user interface includes one of: the first indicator, the second indicator, or the third indicator.

8. An apparatus comprising:

at least one memory configured to store device description files corresponding to first and second field devices associated with an industrial process control system; and at least one processing device configured to:
 compare multiple field device characteristics of the first and second field devices using the device description files;
 identify any differences between the device characteristics of the first field device and the device characteristics of the second field device;
 determine a compatibility of the first and second field devices based on any identified differences; and
 generate a graphical user interface identifying any differences between the device characteristics of the first field device and the device characteristics of the second field device, wherein the graphical user interface includes:
  a first indicator representing one or more device characteristics that are identical between the first and second field devices;
  a second indicator representing one or more device characteristics that are present in the first field device and not present in the second field device; and
  a third indicator representing one or more device characteristics that are new in the second field device and not present in the first field device;
 wherein the first, second, and third indicators are visually different from each other.

9. The apparatus of claim 8, wherein the at least one processing device is further configured to generate a report identifying results of the comparisons of the device characteristics.

10. The apparatus of claim 9, wherein the report identifies an overall replacement compatibility result and a result of a comparison of each device characteristic.

11. The apparatus of claim 8, wherein the field device characteristics relate to field device attributes, field device function blocks, and function block parameters of the first and second field devices.

12. The apparatus of claim 11, wherein the at least one processing device is configured to identify any differences by:

identifying field device attributes that are identical between the field devices, that are different between the field devices, that are present in the first field device and missing in the second field device, and that are new in the second field device and not present in the first field device;

identifying field device function blocks that are identical between the field devices, that are different between the field devices, that are present in the first field device and missing in the second field device, and that are new in the second field device and not present in the first field device; and identifying function block parameters that are identical between the field devices, that are different between the field devices, that are present in the first field device and missing in the second field device, and that are new in the second field device and not present in the first field device.

13. The apparatus of claim 11, wherein the at least one processing device is configured to determine the compatibility by:

determining whether each field device attribute is compatible between the field devices and, if not, identifying a priority of the incompatibility for that field device attribute;

determining whether each field device function block is compatible between the field devices and, if not, identifying a priority of the incompatibility for that field device function block; and determining whether each function block parameter is compatible between the field devices and, if not, identifying a priority of the incompatibility for that function block parameter.

14. The apparatus of claim 8, wherein the at least one processing device is configured to receive an identification of the first and second field devices from a user via the graphical user interface.

15. A non-transitory computer readable medium embodying a computer program, the computer program comprising computer readable program code that when executed causes at least one processing device to perform:

identifying device description files corresponding to first and second field devices associated with an industrial process control system;

comparing multiple field device characteristics of the first and second field devices using the device description files;

identifying any differences between the device characteristics of the first field device and the device characteristics of the second field device;

determining a compatibility of the first and second field devices based on any identified differences; and generating a graphical user interface identifying any differences between the device characteristics of the first field device and the device characteristics of the second field device, wherein the graphical user interface includes:
 a first indicator representing one or more device characteristics that are identical between the first and second field devices;
 a second indicator representing one or more device characteristics that are present in the first field device and not present in the second field device; and
 a third indicator representing one or more device characteristics that are new in the second field device and not present in the first field device;
wherein the first, second, and third indicators are visually different from each other.

16. The non-transitory computer readable medium of claim 15, wherein the computer program further comprises computer readable program code that when executed causes at least one processing device to perform generating a report identifying results of the comparisons of the device characteristics.

17. The non-transitory computer readable medium of claim 15, wherein the field device characteristics relate to field device attributes, field device function blocks, and function block parameters of the first and second field devices.

18. The non-transitory computer readable medium of claim 17, wherein the computer readable program code for identifying any differences comprises computer readable program code that when executed causes at least one processing device to perform:
identifying field device attributes that are identical between the field devices, that are different between the field devices, that are present in the first field device and missing in the second field device, and that are new in the second field device and not present in the first field device;
identifying field device function blocks that are identical between the field devices, that are different between the field devices, that are present in the first field device and missing in the second field device, and that are new in the second field device and not present in the first field device; and
identifying function block parameters that are identical between the field devices, that are different between the field devices, that are present in the first field device and missing in the second field device, and that are new in the second field device and not present in the first field device.

19. The non-transitory computer readable medium of claim 17, wherein the computer readable program code for determining the compatibility comprises computer readable program code that when executed causes at least one processing device to perform:
determining whether each field device attribute is compatible between the field devices and, if not, identifying a priority of the incompatibility for that field device attribute;
determining whether each field device function block is compatible between the field devices and, if not, identifying a priority of the incompatibility for that field device function block; and
determining whether each function block parameter is compatible between the field devices and, if not, identifying a priority of the incompatibility for that function block parameter.

20. The non-transitory computer readable medium of claim 17, wherein the computer readable program further comprises computer readable program code that when executed causes at least one processing device to perform:
receiving, through the graphical user interface, a user selection of the device description files corresponding to the first and second field devices,
wherein, for each of the field device characteristics of the first and second devices, the graphical user interface includes one of: the first indicator, the second indicator, or the third indicator.

* * * * *